United States Patent [19]
Miyazawa

[11] 4,166,247
[45] Aug. 28, 1979

[54] CONTROL SYSTEMS FOR PULSE WIDTH CONTROL TYPE INVERTER

[75] Inventor: Yoshiaki Miyazawa, Kodaira, Japan

[73] Assignee: Tokyo Shibaura Denki Kabushiki Kaisha, Kanagawa, Japan

[21] Appl. No.: 862,358

[22] Filed: Dec. 19, 1977

[30] Foreign Application Priority Data

Dec. 23, 1976 [JP] Japan .................. 51-154171

[51] Int. Cl.² ............................................. H02M 7/00
[52] U.S. Cl. ...................................... 328/69; 328/58; 363/41; 363/43
[58] Field of Search ............... 328/58, 69, 70; 363/41, 363/43

[56] References Cited
U.S. PATENT DOCUMENTS

| 3,609,507 | 9/1971 | Beck | 363/41 |
| 3,662,247 | 5/1972 | Schieman | 363/41 |
| 4,047,058 | 9/1977 | Green | 328/70 |
| 4,075,569 | 2/1978 | Wright | 328/58 |

FOREIGN PATENT DOCUMENTS 49-78130 7/1974 Japan .
49-70136 7/1974 Japan .

Primary Examiner—John S. Heyman
Attorney, Agent, or Firm—Stevens, Davis, Miller & Mosher

[57] ABSTRACT

A control system for controlling the conduction period of the switching elements of a pulse width control type inverter is provided having a reference pulse generator that determines the output frequency of the inverter output voltage, a constant voltage control circuit for generating an analogue output voltage, an A-D converter for converting the analogue output voltage into a digital output signal and a up-counter which counts clock pulses. The outputs of the up-counter and the A-D converter are compared with each other by a digital comparator. The up-counter is cleared by the reference pulse when another up counter counts a predetermined number of output pulses from the comparator. The up-counter repeats a predetermined number of counting up and clearing operations until it produces a carry signal, and the conduction period of the switching element is determined by an interval between the generation of the reference signal and the generation of the carry signal. In a modified embodiment the up-counter is substituted by a down counter.

4 Claims, 13 Drawing Figures

CONTROL SYSTEMS FOR PULSE WIDTH CONTROL TYPE INVERTER

BACKGROUND OF THE INVENTION

This invention relates to a control system for a pulse width control type inverter.

One example of an application of the pulse width control type inverter involves providing voltage regulation for an available source of electric current. Since such a source is connected to a load computer, electric communication apparatus or the like, it is desirable to have apparatus for providing a fast transient response when an external disturbance such as the variations in DC voltage and load are experienced.

Figure 1:
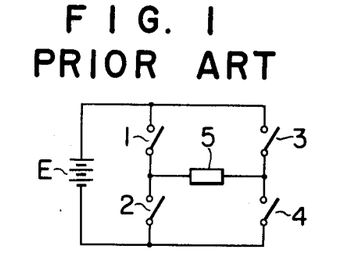
FIG. 1 shows a basic construction of a pulse width control type inverter.

As diagrammatically shown in FIG. 1, a conventional pulse width control type inverter comprises four semiconductor switching elements 1 through 4, such as power transistors and thyristors, which are ON-OFF controlled in a predetermined sequence for converting the power of a DC source E into alternating current which is applied to an AC load 5. In order to maintain the voltage across load 5 at a constant value irrespective of variations in the DC voltage E, the conduction periods of the switching elements 1–4 are controlled in accordance with the magnitude of the DC voltage, or the conduction periods of switching elements 2 and 4 alone are controlled while the conduction periods of the switching elements 1 and 3 are maintained fixed.

Figure 2:
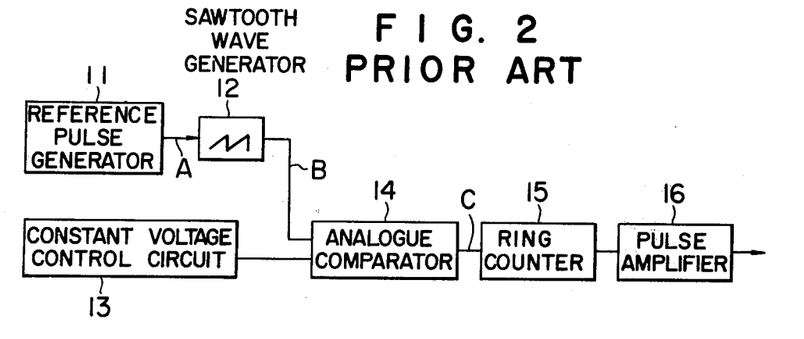
FIG. 2 is a block diagram showing one example of a prior art control system for an inverter of the pulse width control type.

FIG. 2 shows one example of a control system which controls the conduction periods of the switching elements 1–4 and comprises a reference pulse generator 11 generating pulses having a frequency which is an integer multiple (in this example, twice) of the output frequency of the inverter for determining the frequency thereof, a sawtooth wave generator for generating a signal synchronized with of the reference pulses, a constant voltage control circuit 13 for producing an analogue signal having a level corresponding to the DC voltage for the purpose of obtaining a desired output voltage, an analogue comparator 14 which compares the output of the sawtooth wave generator with the output of the constant voltage control circuit 13, a ring counter 15 which in response to the output of the comparator 14 forms a pulse signal adapted to ON-OFF control the switching elements 1–4 shown in FIG. 1 in a predetermined sequence, and a pulse amplifier 16 which amplifies the output of the ring counter 15 to a level that can directly ON-OFF control the switching elements 1 to 4.

Figure 3A:
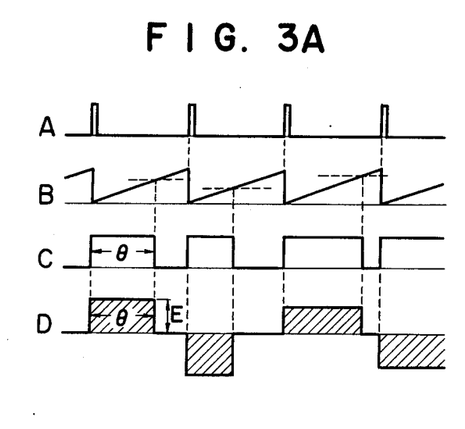
FIG. 3A are waveforms useful to explain the operation of the control system shown in FIG. 2.

FIG. 3A shows waveforms useful to explain the operation of the control system shown in FIG. 2. A, B and C show the waveforms of voltages at corresponding portions of the system shown in FIG. 2. The dotted line level of curve B corresponds to the output of the constant voltage control circuit 13. While this level is higher than that of the output of the sawtooth wave generator 12 the output C of the analogue computer 14 becomes "1" and when the output level of the sawtooth wave generator 12 is higher than the output of the constant voltage control circuit 13, the output C becomes "0". During an interval in which the output C of the analogue comparator 14 is "1" a control signal is applied to the inverter through ring counter 15 and pulse amplifier 16 for rendering ON the switching elements 1-4 in a predetermined sequence thus producing an alternating current output as shown by curve D. In this manner, the conduction period $\theta$ of the switching elements 1 to 4 vary depending upon the output level of the constant voltage control circuit 13. Accordingly, the output voltage shown by curve D is controlled such that the product $E \times \theta$ of the DC voltage E and the conduction period $\theta$ is always constant. Therefore, it is possible to always obtain a constant output voltage regardless of the variation in the DC voltage E.

Figure 3B:
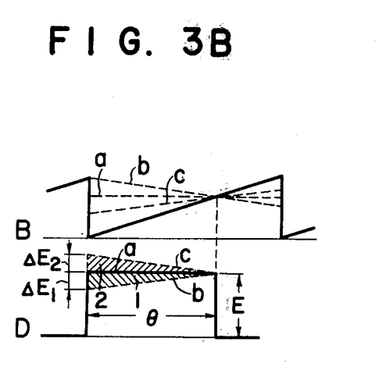
FIG 3B shows enlarged views of portions of the waveforms shown in FIG. 3A for explaining the operation of the control system shown in FIG. 2 when the DC voltage varies.

The control system described above, however, can not provide an efficient control by following the output of the constant voltage control circuit when the DC voltage varies rapidly as occurs when switching is made between a commercial source and a battery source. FIG. 3B shows enlarged views of portions of curves B and D shown in FIG. 3A which are useful to explain the operation of the control system when the DC voltage varies rapidly. In FIG. 3B, lines a, b and c of curve B show the output of the constant voltage control circuit 13. Since lines a, b and c interesect the output of the sawtooth wave generator 12 at the same level, the conduction periods $\theta$ are the same. Even when the constant voltage control circuit 13 has no internal delay and is provided with a DC voltage detecting means for improving its control ability, when the DC voltage varies as shown by curve D-b, FIG. 3B, the output of the constant voltage control circuit 13 varies as shown by curve B-b, FIG. 3B. When the DC voltage varies as shown by curve D-c, the output of the constant voltage control circuit varies as shown by curve B-c. In each case, however, the conduction period $\theta$ is the same as for the circumstance where the DC voltage is constant as shown by curve D-a. Accordingly, when the DC voltage is constant, product $E \times \theta$ is also constant, but when the DC voltage varies as shown by curve D-b, a deficiency shown by hatched portion 1 and having an area of $\Delta E_1 \times \theta/2$ appears as an error, whereas when the DC voltage varies as shown by curve D-c. a surplus shown by hatched portion 2 and having an area of $\Delta E_2 \times \theta/2$ also appears as an error. Thus, with the control system described above when the rate of variation of the output of the constant voltage control circuit is large, it is difficult to obtain a high response speed. While the foregoing description is made with respect to the variation of the DC voltage, the same difficulty also arises when the output voltage varies due to a rapid variation of the load.

Where the control system is constructed by using analogue techniques, the sawtooth wave generator 12 usually comprises an integrator in the form of an operational amplifier, and it is necessary to use complicated circuit for the purpose of compensating for the characteristics of electronic circuit components such as diodes and transistors, and the off-set voltage and temperature drift of the operational amplifier. Moreover, it is not easy to adjust the inclination and linearity of the sawtooth wave. Also, the analogue comparator 14 is generally constructed with an operational amplifier but this circuit is also difficult to adjust due to the characteristics of the circuit components. Furthermore, the operation of the comparator is affected by noise superposed upon the input signal. Accordingly, it is necessary to use a complicated circuit for overcoming these defects.

SUMMARY OF THE INVENTION

It is, therefore, an object of this invention to provide an improved control system for a pulse width control type inverter having excellent transient response for such external disturbances as the variations in the DC voltages and load, and having a simplified circuit construction which need not be adjusted.

Another object of this invention is to provide a control system for a pulse width control type inverter which can operate accurately without being affected adversely by the characteristics of electronic circuit components that comprise the control system.

A further object of this invention is to provide an improved control system for a pulse width control type inverter provided with an overcurrent protective device.

According to one embodiment of this invention there is provided a control system for a pulse width control type inverter having a plurality of switching elements, comprising a constant voltage control circuit for producing an analogue output, an A-D converter for converting the analogue output into a digital signal, a reference pulse generator which generates reference pulses that determine the output frequency of the inverter, a clock pulse generator which generates clock pulses in synchronism with the reference pulses and having a frequency corresponding to an integer multiple of the reference pulses, a binary up-counter having a predetermined number of steps and connected to be cleared by the reference pulses and to count the clock pulses generated by the clock pulse generator, a digital comparator for comparing the output of the binary up-counter with the output of the A-D converter, a m step (m represents an integer) up counter for counting the rising edge of the output of the digital comparator, means responsive to the rising edge of the output of the digital comparator for clearing the binary up-counter thereby repeating m times the counting up and clearing operations of the binary up-counter until the up-counter produces a carry signal, the interval between the generation of the reference signal being used and the generation of the carry signal as a signal for determining the conduction period of the switching elements.

According to another embodiment of this invention the control system comprises a control voltage control circuit for producing an analogue output, an A-D converter for converting the analogue output into a digital signal, a reference pulse generator which generates reference pulses that determine the output frequency of the inverter, a clock pulse generator which generates clock pulses in synchronism with the reference pulse and having a frequency corresponding to an integer multiple of that of the reference pulses, a presettable down counter responsive to the generation of the reference pulses for presetting the output of the A-D converter to an initial value and then counts down the same in response to the clock pulses generated by the clock pulse generator until a shift down pulse is produced, a m step (m represents an integer) up-counter connected to count the shift down pulses, and means responsive to the output of the up-counter for clearing the down counter when it generates the shift down pulse to preset again the output of the A-D counter thereby repeating m times the counting down and the clearing operations of the down counter until the up counter produces a carry signal, the interval between the generation of the reference pulse and the generation of the carry signal being used as a signal for determining the conduction period of the switching elements.

DESCRIPTION OF THE PREFERRED EMBODIMENTS

Figure 4:
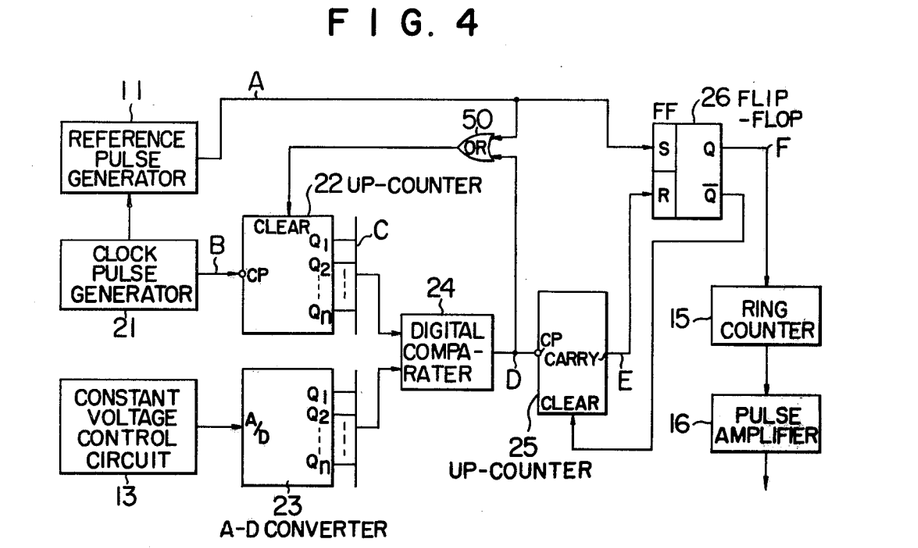
FIG. 4 is a block diagram showing one embodiment of the control system of a pulse width control type inverter.

In a preferred embodiment of this invention as shown in FIG. 4, circuit elements corresponding to those shown in FIG. 2 are designated by the same reference characters. In addition to those shown in FIG. 2 there are provided clock pulses generator 21 which generates a clock pulse having a frequency of an integer multiple of the frequency of the pulses generated by the reference pulse generator 11 in synchronism therewith, a n (an integer) bit binary up-counter 22 which counts the number of the clock pulses generated by the clock pulse generator 21 for producing n bit binary code outputs, an A-D converter 23 which converts an analogue output signal of the constant voltage control circuit 13 into a digital signal in the form of a n bit binary code, a digital comparator 24 which compares the output of the up-counter 22 with the digital output of the A-D converter 23 for producing an output "1" or "0" in accordance with the relative magnitude of the inputs, a m (integer) step up-counter 25 which counts the change of the output of the digital comparator 24 from "0" to "1", that is the rising edge of the output and a R.S. flip-flop circuit 26.

Figure 5A:
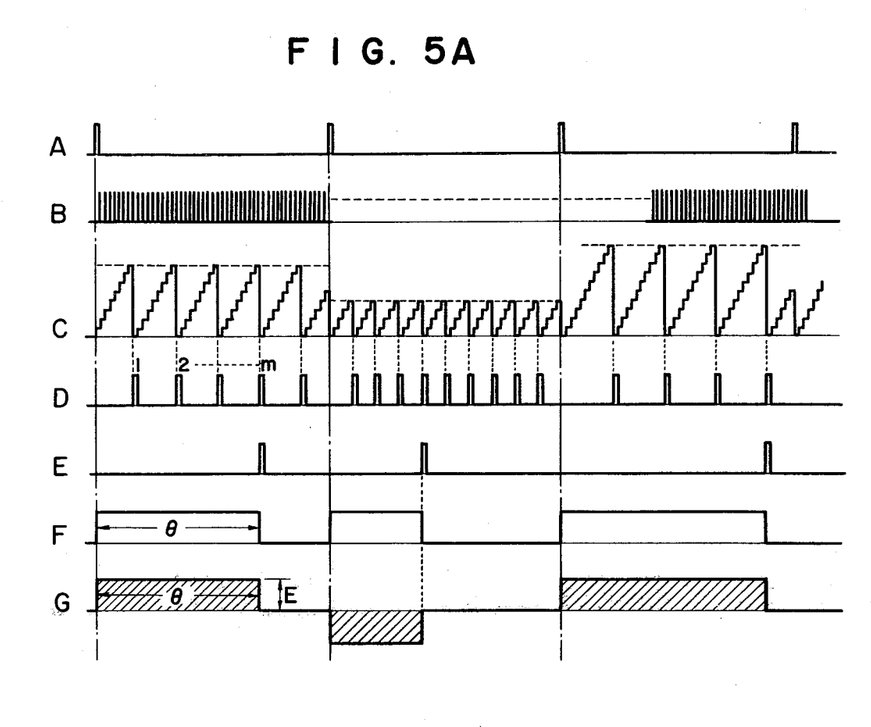
FIG. 5A shows waveforms useful to explain the operation of the control system shown in FIG. 4.

In FIG. 5A, curves A through F show waveforms at points A through F shown in FIG. 4. As above described the prior art control system comprises a sawtooth wave generator and an analogue comparator, whereas the control system of this embodiment comprises an A-D converter 23 which converts the analogue output of the constant voltage control circuit 13 into a n bit digital signal, a n bit binary up-counter 22, a digital comparator 24 and a m step up-counter 22. The A-D converter 23 which produces n bit outputs can represent $2^n$ type states and it is constructed to produce $(2^n - 1)$ codes of the digital output when the output of the constant voltage control circuit 13 is at a maximum where n and m are integers. At this time, the clock frequency of the clock pulse generator 13 is selected to be $2^n \times m$ times the frequency of the reference pulses. The binary up-counter 22 is cleared by the output of an OR gate circuit 50 when a reference pulse is generated and then starts to count the number of clock pulses. The output of the up-counter 22 and the output of the A-D converter 23 which produces $2^n$ types of digital signals are compared with each other by digital comparator 24. When the output of the up-counter 22 is greater than the output of the A-D converter 23 the digital comparator 24 produces an "1" output. When the output 22 of the up-counter is smaller than the output of the A-D converter 23, the comparator 24 produces an "0" output. The output of the comparator 24 changes from "0" to "1" when the output of the counter 22 becomes greater than the output of the A-D converter 23 so that the OR gate circuit 50 is enabled to clear again the up-counter 22. At the same time, the rising edge which occurs when the output of comparator 24 changes from "0" to "1" is counted by m step up-counter 25. At the same time, when counter 22 is cleared the output of digital comparator 24 returns to "0" from "1" as shown by curve D in FIG. 5 whereby the counter 22 begins to count up in a manner as above described. When the m step up-counter 25 counts m leading edges of the output of the digital comparator 24, the carry output of the counter 25 becomes "1" as shown by curve E. When the R.S flip-flop circuit 26 which has been set by the output of the reference pulse generator 11 is reset by the carry output, the conduction period $\theta$ is determined by the Q output of the flip-flop circuit 26 as shown by curve F whereby an alternating current shown by curve G is produced. At this time, the counter 25 is cleared simultaneously with the reset of the flip-flop circuit 26 so that the counter 25 will not count until next reference pulse is applied. Denoting the number of outputs of the A-D converter 23 by P, the conduction period $\theta$ would correspond to PXm clock pulses and the output voltage E shown by curve G would be controlled such that $E \times \theta$ is constant in the same manner as in the prior art.

By constructing the control system of the pulse width control type inverter with digital techniques it is possible to improve the transient response of the control system for such external disturbances as variations in the DC voltage and load.

Figure 5B:
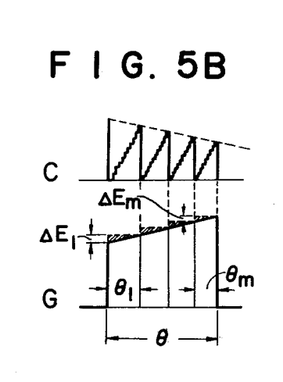
FIG. 5B shows enlarged views of certain portions of the waveforms shown in FIG. 5.

FIG. 5B is an enlarged view of certain portions of curves C and G shown in FIG. 5A where the DC voltage varies rapidly in the embodiment shown in FIG. 4. In FIG. 5B when the DC voltage varies according to curve G in a manner as has been already described in connection with FIG. 3B, the output of the A-D converter 23 which converts the analogue output of the constant voltage control circuit 13 into a digital signal varies as shown by the dotted lines of curve C and in response to this variation the control system produces a conduction period of $\theta = \theta_1 + \theta_2 + \ldots + \theta_m$. Accordingly, the error in this case corresponds to the error caused by the deficient portion of the inclined portion of curve G $$\frac{\Delta E_1 \times \theta_1}{2} + \frac{\Delta E_2 \times \theta_2}{2} + \ldots + \frac{\Delta E_m \times \theta_m}{2}$$

However, the error is far smaller than the error shown by D-1 of FIG. 3B of the conventional control system, and can be reduced to a negligible value by increasing m. In other words, the control system of this invention can respond at a high speed to a rapid variation in the output of the constant voltage control circuit 13.

Since the control system of this invention utilizing digital techniques is required to merely indicate "0" or "1" state of the signal it is not necessary to consider such factors as the offset voltage of the operational amplifier, and the characteristics of such electronic circuit components as diodes and transistors which caused problems in the prior art control system utilizing an analogue circuit. Moreover, since the inclination angle of the curve passing through respective counts of the binary up-counter 22 is determined by the frequency of the clock pulses it is not necessary to adjust the inclination angle and linearity of the sawtooth wave shown in FIG. 3A, and the digital comparator does not require any level adjustment as in an analogue comparator. Since the accuracy of the linearity of the counts of the binary up-counter 22 is determined to be $\frac{1}{2^n \times m}$) the ratio of the clock pulse frequency to the reference pulse frequency, it is possible to improve the accuracy by increasing the bit number n of the binary up-counter 22 and the A-D converter 23 or the step number m of the up-counter 25. Accordingly, it is possible to obtain sufficient accuracy by selecting $2^n \times m$ to be about several hundred. With recent development of data transmission technique, the cost of an A-D convertor has been greatly decreased and it becomes possible to fabricate a binary up-counter, a digital comparator and a multi-step up counter with one or two integrated circuits without using additional resistors, capacitors and diodes, thus obtaining an inexpensive control system having a simple construction and yet extremely reliable.

Figure 6:
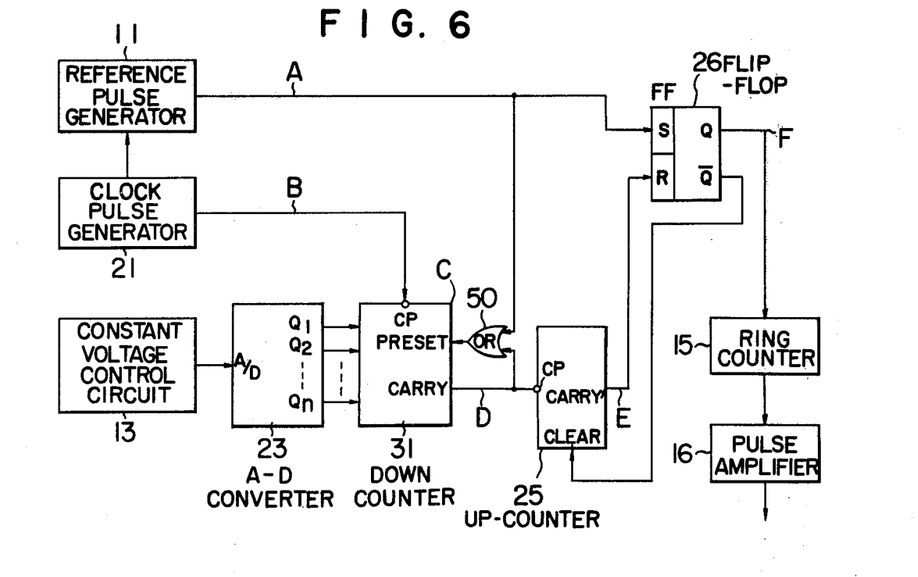
FIG. 6 is a block diagram showing a modified embodiment of this invention.
Figure 7A:
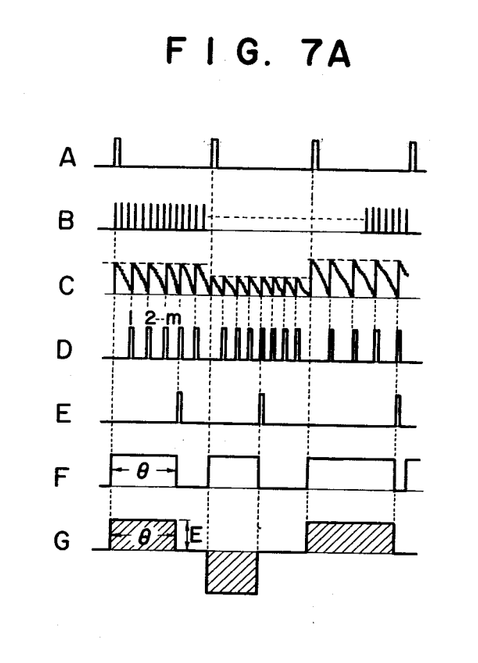
FIG. 7A shows waveforms helpful to explain the operation of the modified embodiment shown in FIG. 6.
Figure 7B:
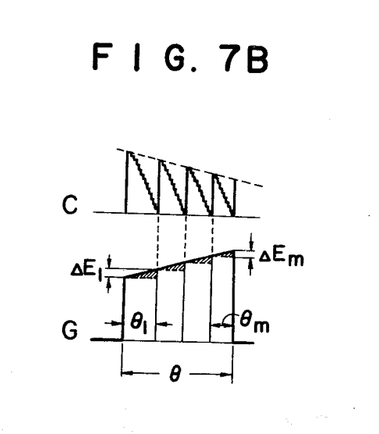
FIG. 7B shows enlarged views of certain portions of the waveforms shown in FIG. 7A.

FIG. 6 shows a modified embodiment of this invention in which elements corresponding to those shown in FIG. 4 are designated by the same reference characters. In this modification, there is provided a $2^n$ step presettable, down counter 31 into which the output of the A-D converter 23 is preset by the output of OR gate circuit 50. OR gate 50 has inputs connected to receive the output of the reference pulse generator 11 and the shift down signal produced by the counter 31. The initial value thus preset is counted down by the clock pulses generated by clock pulse generator 21. The operation of this modification can be understood from FIG. 7A in which curve C shows the progress of counting of the down counter 31, the dotted lines thereof showing the output of the A-D converter 23. In this modification, the n bit binary up-counter 22 and the digital comparator 24 shown in FIG. 4 were substituted by the $2^n$ step presettable down counter 31. More particularly, at the same time the R.S flip-flop circuit 26 is set by the reference pulse A, the output of the A-D converter 23 is preset in the down counter 31 by the reference pulses and the initial value thus set is counted down by the clock pulse generated by the clock pulse generator as shown by curve C. Denoting the output of the A-D converter 23 by P, the initial value is sequentially counted down as P, P-1, P-2 . . . , and when the count reaches zero, a shift down pulse is generated as shown by curve D which is counted by m step up-counter 25. In response to this shift down pulse and the reference pulse A, the OR gate circuit 50 applies a preset intruction to the down counter 31 thus causing it to be preset again with the output of the A-D converter 23 and then count down. The above described cycle of operation is repeated m times until m shift down pulses produced by the down counter 31 has been counted at which time a carry signal is produced by the up-counter 25 as shown by curve E. This carry signal resets flip-flop circuit 26 so that the conduction period $\theta$ becomes equal to (Pxm) clock pulses. In this modification a high transient response can be obtained for such external disturbances as the variations in the DC voltage and the load. FIG. 7B is an enlarged view of certain portions of curves C and G shown in FIG. 7A. The error in this case is the error caused by surplus portions $$\frac{\Delta E_1 \times \theta_1}{2} + \frac{\Delta E_2 \times \theta_2}{2} + \ldots + \frac{\Delta E_m \times \theta_m}{2}$$

As has already been described with reference to FIG. 5B this error can be decreased by increasing m.

With the construction shown in FIG. 6, the down counter 31 too can be fabricated with only one or two down counters thus simplifying the circuit construction and increasing the reliability of the control system.

Although the foregoing description refers to a pulse width control type inverter as shown in FIG. 1, the inverter may be of single phase or poly phase type and the invention is applicable to any type of inverter that can produce an AC output having a waveform approximately a sinusoidal wave.

It should be understood that the combination of the constant voltage control circuit and the A-D converter can be substituted a microcomputer or other device that produces digital signals.

Figure 8:
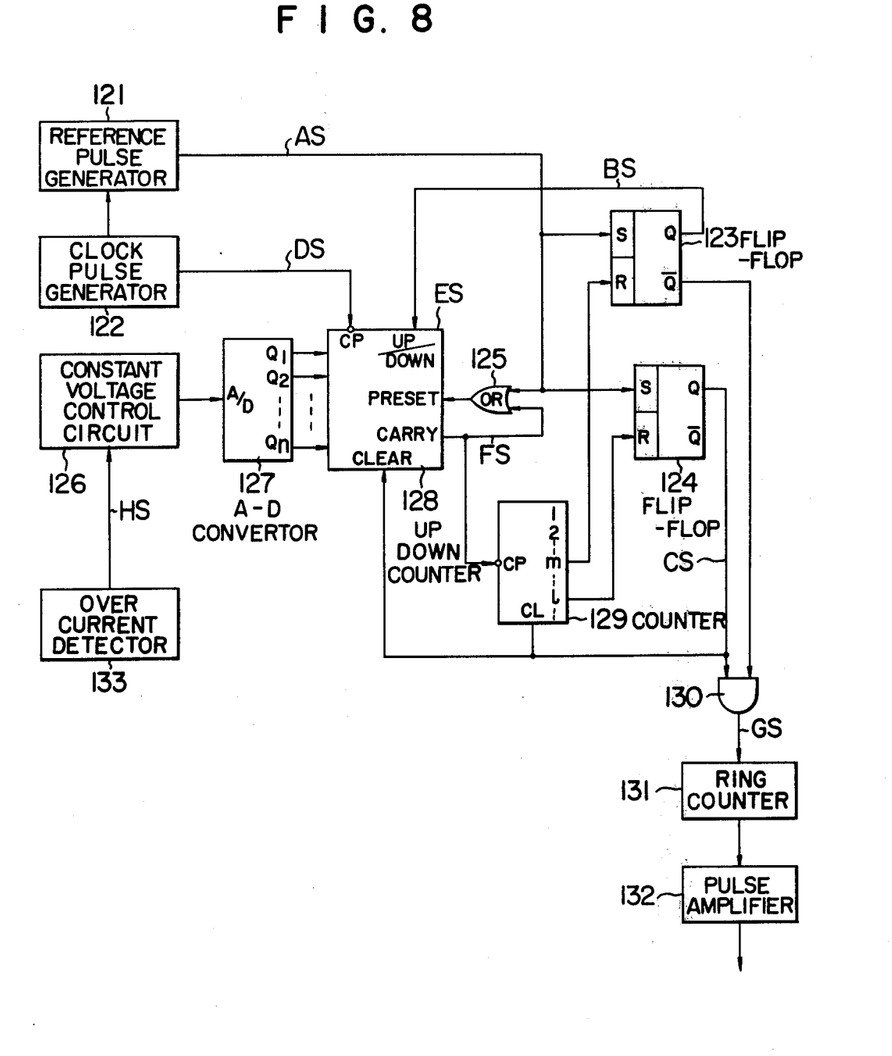
FIG. 8 is a block diagram showing another modification of this invention.

In a modified embodiment shown in FIG. 8, there is provided a reference pulse generator 121 which produces reference pulses AS having a frequency of an integer multiple (in this embodiment twice) of the output frequency of the inverter, a clock pulses generator 122 which generates a clock pulse DS having a frequency of an integer multiple of the frequency of the reference pulses AS and in synchronism therewith, R.S flip-flop circuits 123 and 124, an OR gate circuit 125, a constant voltage control circuit 126 which generates an analogue signal having a level corresponding to the DC voltage, an A-D converter 127 which converts this analogue signal into a digital signal comprising a n (an integer) bit binary code, and a binary presettable up down counter 128 into which the output of the A-D converter 127 is preset by a preset signal produced by the OR gate circuit 125. The Q output of the flip-flop circuit 123 is applied to the up down counter 128 to cause it to count up or down clock pulses DS generated by the clock pulse generator 122 starting from said preset initial value. The up down counter 128 produces a carry signal during its counting up operation and a shift down signal during its counting down operation. Counter 129 up counts the output FS of the up down counter 128 to produce decimal coded outputs 1, 2, ... m ... 1 ... An AND gate circuit 130 is provided having its inputs connected to receive the $\overline{Q}$ output of flip-flop circuit 123 and the Q output of flip-flop circuit 124. The output GS of AND gate circuit 130 is applied to a ring counter 131 which produces a pulse signal adapted to ON-OFF control the switching elements of the inverter according to a predetermined sequence. The output of the ring counter is applied to the inverter through an amplifier 132. An overcurrent detector 33 is provided to detect the overcurrent condition on the output side of the inverter caused by a short circuit, for example, and supply an instruction signal HS to the constant voltage control circuit 126 so as to rapidly decrease the output level thereof.

The operation of the control system shown in FIG. 8 will now be described with reference to FIG. 9 which shows various waveforms, in which curves AS through HS correspond to those shown in FIG. 8. In curve ES, Ec shows the count of the up down counter 125 while dotted lines the levels of the digital outputs of the A-D converter 127. The n bit output of this converter can represent $2^n$ types of the states. When the output of the constant voltage control circuit 126 is at a maximum, the digital output thereof has a code of $(2^n-1)$ and the frequency of the clock pulse DS is selected to be $(2^n \times 1)$ times of the frequency of the reference pulses AS. The ouputs of the counter 129 are applied to flip-flop circuits 123 and 124 to act as reset pulses at counts m and l respectively, where L=3 m. The up down counter 128 switches between counting up and counting down operations in response to the Q output of flip-flop circuit 123 and performs its counting operation only when the output of counter 129 and the Q output of flip-flop circuit 24 are "1" and is cleared when these outputs are "0".

In response to a reference pulse AS (FIG. 9A) produced by the reference pulse generator 121, both flip-flop circuits 123 and 124 are set. At the same time, the reference pulse AS is applied as a preset instruction to the up down counter 128 through the OR gate circuit 125 presetting outputs $E_1, E_2 \ldots$ of the A-D converter 127 as initial values for up down counter 128 which are counted up by the clock pulses DS as shown in curve E, FIG. 9. It is now assumed that the output of the A-D converter 127 is $E_1$, then the clock pulses are counted up as $E_1, (E_1+1), (E_1+2) \ldots$. When the count reaches $2^n$ a carry pulse FS is produced as shown by curve F. The carry pulse FS is counted by counter 129 and at the same time applied to the up down counter 128 via OR gate circuit 125 to act as a preset instruction. In this manner, the output of the A-D converter 127 is preset again into the counter 128 to begin the counting up operation. When this operation is repeated m times so that the counter 129 counts m carry signals FS produced by the up down counter 128 the counter 129 applies a reset pulse to the flip-flop circuit 123. At this time, the up down counter 128 is again preset with the output of the A-D converter A-D with a carry signal FS as the preset instruction. At this time, however, since the output of flip-flop circuit 123 is reversed to "0" from "1" as shown by curve B, whereby the up down counter begins to count down from the preset count as $E_1, (E_1-1) (E_1-2) \ldots$ until the count is reduced to zero at which time a shift down pulse is produced as shown by curve F. This shift down pulse is counted by the counter 129 accumulating with the counting of the carry pulse FS produced at the time of counting up. This shift down pulse is applied to the up down counter 128 via the OR gate circuit 125 to preset again the output of the A-D converter 127 and to begin the counting down operation of this preset value. When the above described operation is repeated (l−m) times the up down counter 128 produces (l−m) shift down pulses which are counted by the counter 129 together with m carry signals. In other words the counter 129 counts 1 pulses for applying a reset pulse to flip-flop circuit 124. Concurrently with the reversal of the Q output of the flip-flop circuit 124 from "1" to "0" (see curve C, FIG. 9), the up down counter 128 and countr 129 are cleared and they do not count until next the reference pulse AS is applied. The conduction period $\theta$ (curve G) is determined by the output of AND gate circuit 130 which is applied with the Q output of flip-flop 134 and the Q output of flip-flop circuit 124 whereby the inverter produces an alternating current output as shown by curve J in FIG. 9. This conduction period $\theta$ corresponds to $E_1 \times (1-m)$ clock pulses where $E_1$ represents the output of the A-D converter 127, and the output voltage E shown in FIG. 9 is controlled such that $E \times \theta$ is constant in the same manner as in the previous embodiments. Since the interval $T_1$ between the first reference impulse AS and the leading edge of the output pulse GS of the AND gate circuit 130 is equal to $(2^n - E_1)xm$ clock pulses, and the interval between the first reference pulse AS and the trailing edge of the output pulse GS is equal to $T_1 + \theta = [(2^n - E_1)\cdot m + E_1(1-m)]$ clock pulses, the interval $T_3$ representing the phase is expressed by $$T_3 = \frac{T_1 + T_2}{2} = \frac{2^{n+4} m + E_1(l - 3m)}{2}$$

Since it is selected that $l = 3m$ $$T_3 = \frac{T_1 + T_2}{2} = 2^n \cdot m$$

which is a constant independent from the output $E_1$, of the A-D converter 127. In other words, since at the end of $T_3$, the shift down pulse is generated and since this instant is always constant independent from the output of the A-D converter 127, the phase is maintained at a constant value even when the conduction period $\theta$ varies in response to the output of the A-D converter 127.

Figure 9:
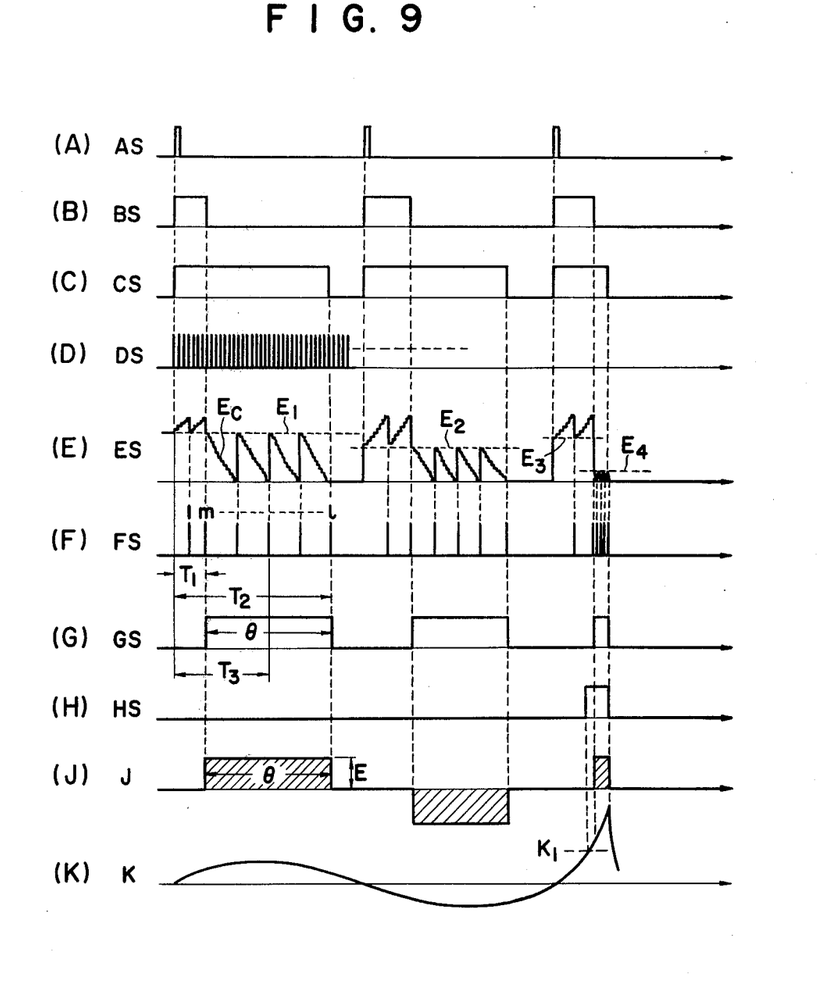
FIG. 9 show waveforms useful to explain the operation of the modification shown in FIG. 8.

When the output current of the inverter becomes excessive due to short circuiting or the like, the overcurrent detector 133 rapidly lowers the output level of the constant voltage control circuit 126 thus rapidly decreasing the output of the A-D converter 127 to level $E_4$ as shown by curve E, FIG. 9 with the result that the period for producing the shift down pulse by the up down counter 128 which has been counting in accordance with output $E_3$ of the A-D converter 127 is decreased greatly as shown by curve F. Accordingly, the conduction period $\theta$ is greatly reduced as shown by curve J thus greatly decreasing the output voltage, and the output current which has been increasing is quickly limited below overload capacity $K_1$ of the inverter as shown by curve K. The time at which the up down counter 128 produces the m th carry pulse FS for determining the leading edge of the output as shown in FIG. 9E varies in a range equal to the fore one half (in this example 90°) of the period of the reference pulse AS in response to the output of the A-D converter 127, whereas the time at which the counter 129 produces $(l-m)$th shift dowm pulse for the purpose of determining the trailing edge of the output pulse GS can be freely varied within the period (in this example 180°) of the reference pulse AS so that it is possible to quickly limit the overcurrent. The error in the conduction period can be made negligibly small as in the preceeding embodiments.

In the circuit shown in FIG. 8, although the output of the overcurrent detector 133 is applied to the constant voltage control circuit 126, this output is also applicable to a clearable buffer circuit, not shown, provided on the digital output side of the A-D converter for decreasing the digital output or to an A-D converter which can be cleared by the output of the overcurrent detector for decreasing the digital output level of such A-D converter.

Figure 10:
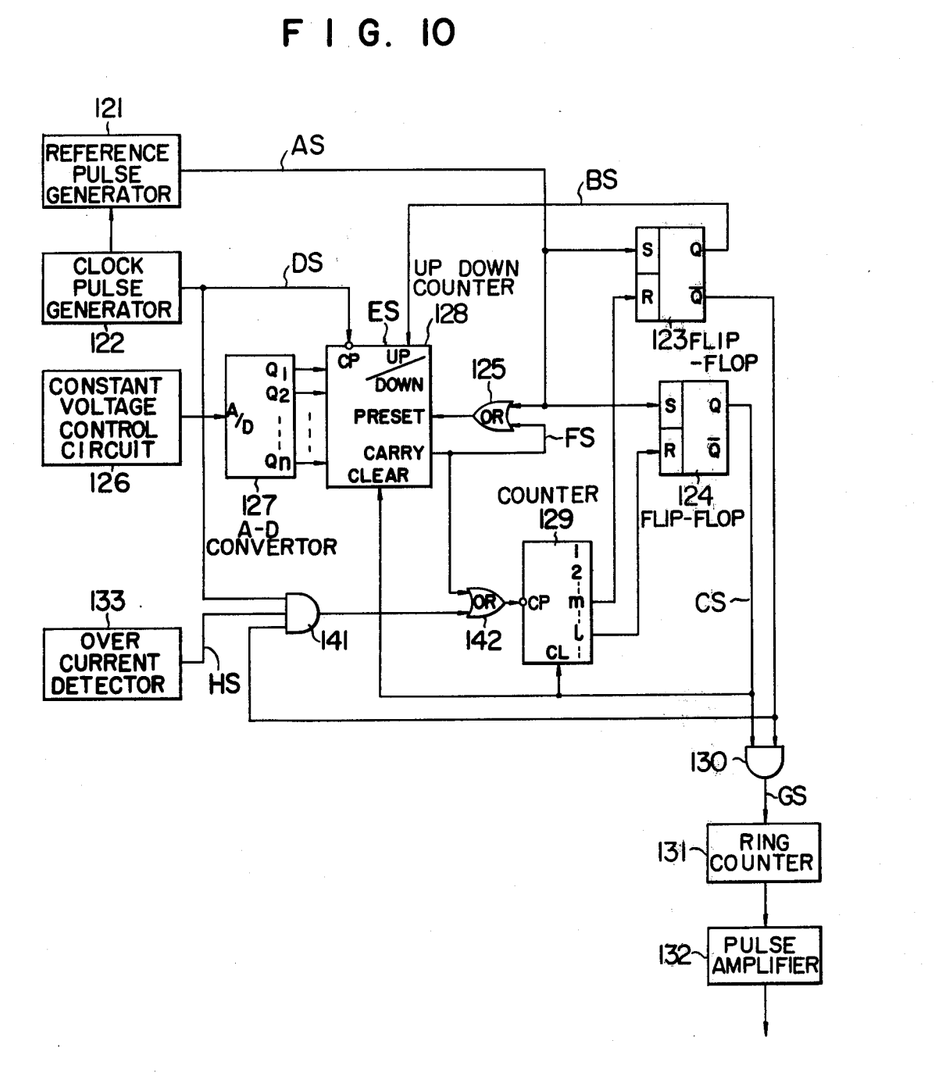
FIG. 10 is a block diagram showing still further embodiment of this invention.

In a modified circuit shown in FIG. 10 instead of applying the output of the overcurrent detector 133 to A-D converter 127, the output is applied to the clock terminal of counter 129 via OR gate circuit 142. It is also possible to apply the output of the overcurrent detector to clearable buffer circuit not shown, to act as a clear signal to lower the level of the digital output or to use an A-D converter capable of clearing its digital output or to the A-D converter as a clear signal for lowering the level of its digital output.

I claim:

1. A control system for a pulse width control type inverter made up of a plurality of switching elements, comprising a constant voltage control circuit for producing an analogue output; and A-D converter for converting said analogue output into a digital signal; a reference pulse generator which generates reference pulses that determine the output frequency of said inverter; a clock pulse generator which generates clock pulses in synchronism with said reference pulses and having a frequency of an integral multiple of that of said reference pulses; a binary up-counter having a predetermined number of steps and connected to be cleared by said reference pulses and counts up the clock pulses generated by said clock pulse generator; a digital comparator for comparing the output of said binary up-counter with the output of said A-D converter; a m step (m represents an integer) up-counter for counting the leading edge of the output of said digital comparator, means responsive to the leading edge of the output of said digital comparator for clearing said binary up-counter thereby repeating m times the counting up and clearing operations of said binary up-counter until said up-counter produces a carry signal so as to use an interval between the generation of a reference pulse and the generation of said carry signal as a signal for determining the conduction period of said switching elements.

2. A control system for a pulse width control type inverter made up of a plurality of switching elements, comprising a constant voltage control circuit for producing an analogue output; an A-D converter for converting said analogue output into a digital signal; a reference pulse generator which generates reference pulses that determine the output frequency of said inverter: a clock pulse generator which generates clock pulses in synchronism with said reference pulses and having a frequency of an integer multiple of that of said reference pulses; a presettable down counter responsive to the generation of said reference pulses for presetting the output of said A-D converter as an initial value and then counts down the same in response to the clock pulses generated by said clock pulse generator until a shift down pulse is produced; a m step (m represents an integer) up-counter connected to count said shift down pulse; and means responsive to the output of said up-counter for clearing said down counter when it generates said shift down pulse to preset again the output of said A-D converter thereby repeating m times the counting down and the clearing operations of said down counter until said up-counter produces a carry signal so as to use an interval between the generation of a reference pulse and the generation of said carry signal as a signal for determining the conduction period of said switching elements.

3. The control system according to claim 1 wherein said last mentioned means comprises a flip-flop circuit which is connected to be set by said reference pulse and reset by the output of said up-counter, means for applying one output of said flip-flop circuit to ON-OFF control said switching elements, means for applying the other output of said flip-flop circuit to said up-counter for clearing the same, and an OR gate circuit having inputs connected to receive said reference pulse and the output of said digital comparators, and an output connected to said up-counter for clearing the same.

4. The control system according to claim 2 wherein said last mentioned means comprises a flip-flop circuit connected to be set by said reference pulse and reset by the output of said up-counter, means for applying one output of said flip-flop circuit to ON-OFF control said switching means, means for applying the other output of said flip-flop circuit to said up-counter for clearing the same, and an OR gate circuit connected to receive said reference pulse and a shift down pulse generated by said down counter for presetting the output of said A-D converter in said down counter.

* * * * *